Dec. 28, 1937.  C. AMBRETTE  2,103,310
CONVERTIBLE HYDRAULIC PRESS FOR LONG AND SHORT PASTE PRODUCTS
Filed March 11, 1935  3 Sheets-Sheet 1
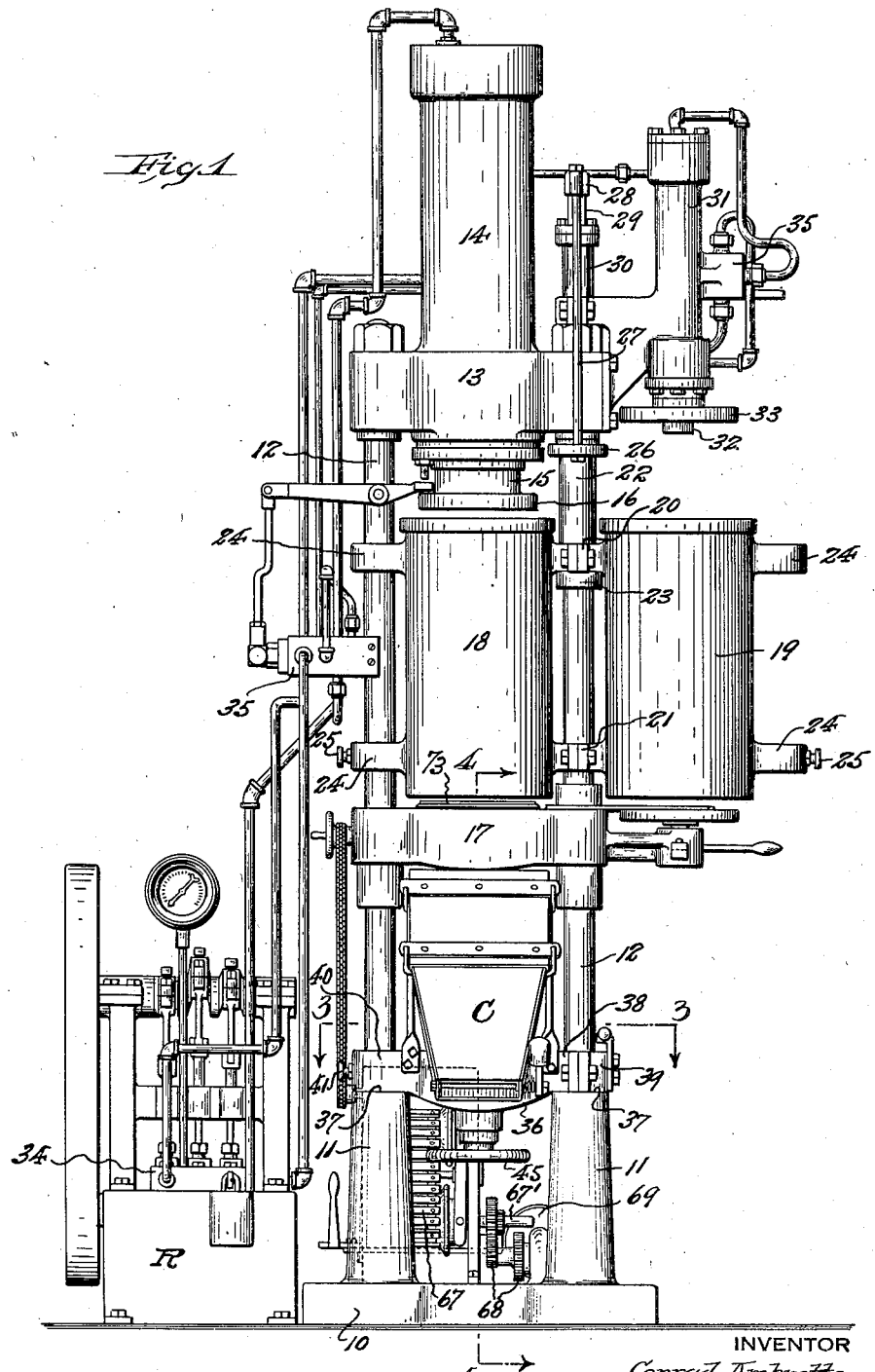
INVENTOR
Conrad Ambrette,
BY
George D. Richards
ATTORNEY

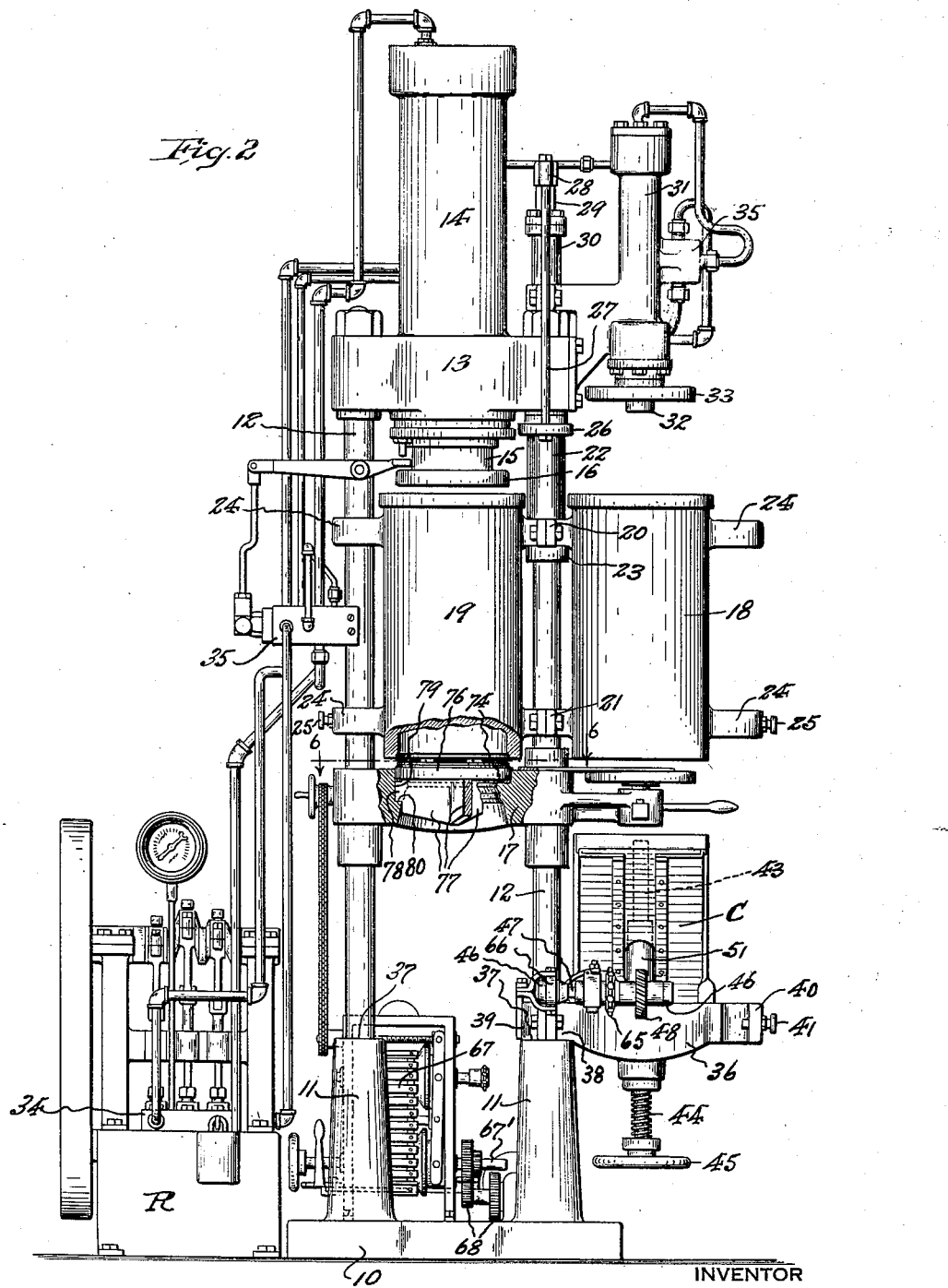

Dec. 28, 1937.                C. AMBRETTE                2,103,310
        CONVERTIBLE HYDRAULIC PRESS FOR LONG AND SHORT PASTE PRODUCTS
                    Filed March 11, 1935          3 Sheets—Sheet 3
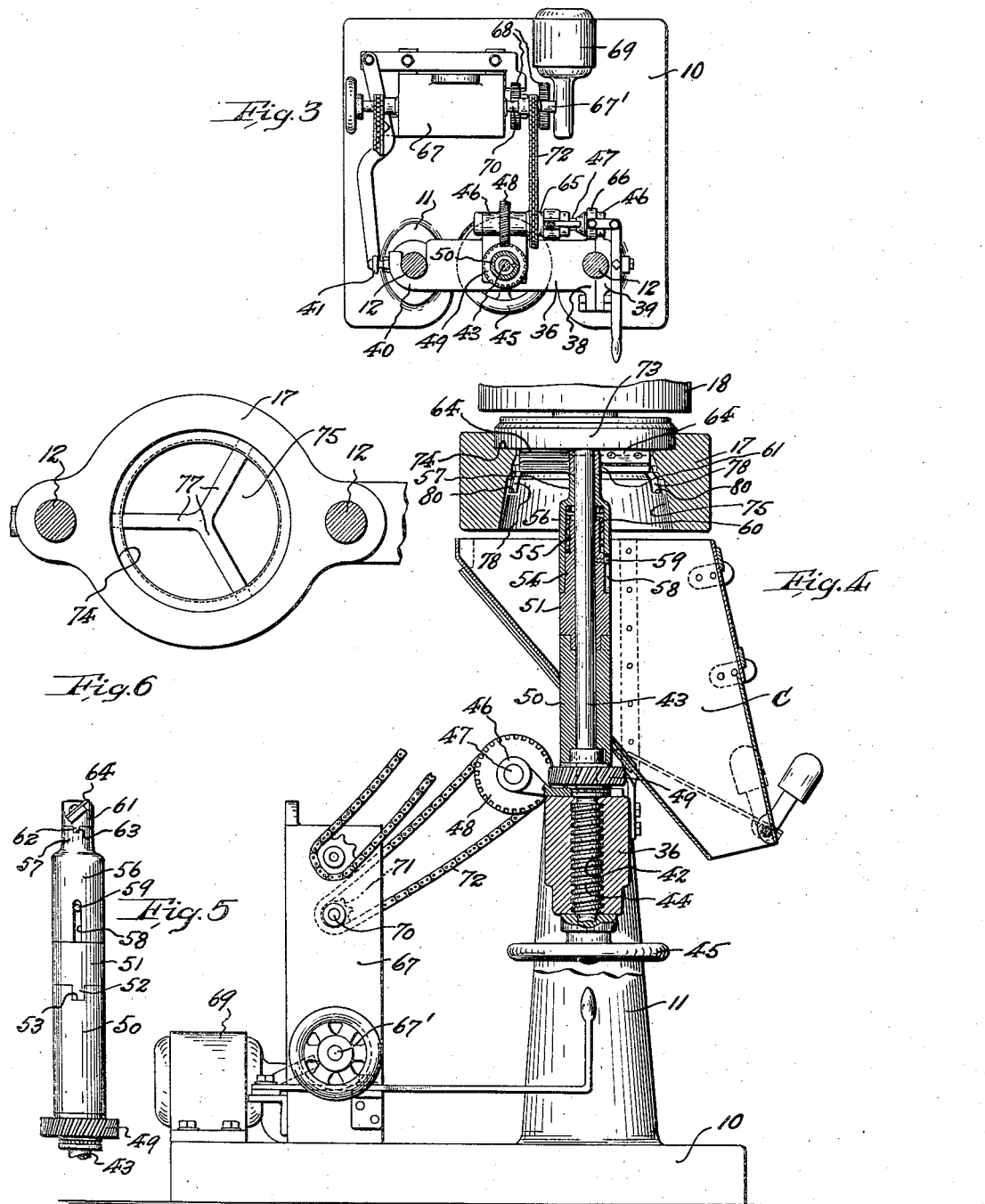
INVENTOR
Conrad Ambrette,
BY
George D. Richards
ATTORNEY Patented Dec. 28, 1937

2,103,310

UNITED STATES PATENT OFFICE 2,103,310

CONVERTIBLE HYDRAULIC PRESS FOR LONG AND SHORT PASTE PRODUCTS

Conrad Ambrette, Brooklyn, N. Y., assignor to Consolidated Macaroni Machinery Corporation, Brooklyn, N. Y., a corporation of New York Application March 11, 1935, Serial No. 10,475

2 Claims. (Cl. 107—14)

This invention has reference to improvements in hydraulic presses for forming alimentary paste products; and the invention relates, more particularly, to a novel construction and arrangement of press which is easily and quickly convertible at will for the forming of either long paste products, such as spaghetti, macaroni, etc., or short cut paste products, such as elbows, alphabets and various other short paste designs.

This invention has for its principal object to provide a novel double purpose hydraulic press, having a novel arrangement of short paste cutting mechanism, so mounted and combined with the press standards as to be capable of disposition in either service position, relative to the operative press cylinder, for the production of short paste, or in out-of-service position, relative to the operative press cylinders, to permit utilization of the press for the production of long paste.

Other objects of this invention, not at this time more particularly enumerated, will be understood from the following detailed description of the same.

An illustrative embodiment of this invention is shown in the accompanying drawings, in which:

Fig. 1 is a front view of the novel double-purpose hydraulic press as arranged preparatory to production of short or cut paste products; and Fig. 2 is a similar view of said press as arranged preparatory to production of long paste products.

Fig. 3 is a horizontal section, taken on line 3—3 in Fig. 1; and Fig. 4 is a fragmentary longitudinal vertical section, taken on line 4—4 in Fig. 1, somewhat enlarged.

Fig. 5 is a detail elevation of the short paste cutting device.

Fig. 6 is an enlarged fragmentary horizontal section, taken on line 6—6 in Fig. 2.

Similar characters of reference are employed in the above-described views, to indicate corresponding parts.

Referring to the drawings, the reference character 10 indicates the base of the press, the same having at its forward end a pair of laterally spaced upstanding pedestals 11. Extending axially upward from the pedestals 11 are columns 12. Affixed to the upper end portions of said columns 12, by a bridging portion 13, is an upstanding pressure cylinder 14 of a hydraulic press means. Vertically slidable in said pressure cylinder 14 is a ram 15 having at its lower outwardly projecting free end a dough extrusion piston 16. Also fixed upon and extending between the columns 12, in properly spaced relation below the pressure cylinder 14 and its ram 15, is a die bed-plate 17.

Pivoted upon one of the columns 12, e. g. the right hand column as shown in Figs. 1 and 2, are a pair of dough cylinders 18 and 19, having intermediate yoke connections 20 and 21. Slidable on said right hand column 12, beneath the bridging portion 13, is a sleeve 22 having an annular abutment or stop flange 23 at its lower extremity. The upper yoke connection 20 swivels upon said sleeve 22, while the lower yoke connection 21 both swivels and slides vertically directly upon said right hand column 12. By this arrangement, the respective dough cylinders may be revolved about said right hand column 12 so as to selectively bring one of the same into operative vertical alignment with the pressure cylinder 14 and its ram 15, while the other is outwardly off-set to an initial loading position. Each cylinder is provided on the outer side thereof, diametrically opposite its swiveled connection to said right hand column 12, with hook-like laterally extending keeper arms 24 which are notched or indented to straddle or embrace the opposite or left hand column 12, when the dough cylinder, from which they project, is operatively aligned with the pressure cylinder 14 and its ram 15, thus stopping and holding the dough cylinder in such aligned position. One of said arms 24 of each dough cylinder is provided with a set-screw 25, or other suitable locking means, whereby the dough cylinders may be locked against displacement from the given positions which they respectively occupy. The sleeve 22 above mentioned is provided at its upper end with lateral extensions 26, to which are connected upwardly extending lift-rods 27, the same being in turn connected by their upper ends to the cross-head 28 of a plunger 29 which is operative in the cylinder 30 of a hydraulic lift-jack. This lift-jack is suitably mounted and secured upon the bridging portion 13 which carries the hydraulic ram means. Also secured to, but outwardly offset from, said bridging portion 13, so as to be vertically aligned over the dough cylinder which is offset to initial packing position, is a hydraulic packer means, comprising a pressure cylinder 31 having a ram 32 vertically movable therein, said ram being provided at its lower downwardly and outwardly projecting end with a packer plunger 33.

Any suitable fluid pump means 34 is provided for delivering fluid under pressure to the various hydraulic ram devices above mentioned; such delivery being made through interconnecting piping, and controlled at will by manipulatable valve means 35 suitably positioned and included in said piping; all as is well known and understood by those familiar with the hydraulic press art, and especially with such presses as are designed for producing alimentary paste products.

Pivoted upon one of the columns 12, preferably the right hand column as shown in Figs. 1 and 2, is a movable bridge block 36, which rests on the shoulders 37 formed by the junctures of the pedestals 11 and columns 12. The pivotal end of said bridge block 36 is provided with a bearing portion 38 to pivotally engage said right hand column 12, said bearing portion being completed by a detachable bearing cap 39, as shown. At its opposite or free end, said bridge block 36 is provided with a laterally indented keeper arm 40 adapted to embrace the opposite or left hand column 12, when the bridge block is swung to service position bridging the pedestals and columns in spaced relation below and in alignment with the die bed-plate 17. Said keeper arm 40 is provided with a set-screw 41, or other suitable locking means, whereby the bridge block may be locked against displacement from its service position as disposed beneath and aligned with the die bed-plate 17.

Centrally located intermediate the ends of said bridge block 36 is a vertically extending internally screw-threaded passage or way 42. Extending upwardly through said bridge block is a spindle 43 having a screw-threaded portion 44 in engagement with the internal threads of the passage or way 42. Fixed on the lower extremity of said spindle 43, beneath the bridge block, is a hand wheel 45 for turning said spindle. Fixedly mounted in connection with said bridge block 36, so as to be laterally offset from a side thereof are suitably spaced bearing portions 46 in which is journaled a lay-shaft 47. Fixed on said lay shaft, so as to be driven thereby, is a driver gear 48. Journaled on said spindle 43 is a driven gear 49 which meshes with said driver gear 48 so as to be driven thereby. Rotatable on said spindle 43 is a sleeve, preferably made in a plurality of longitudinal parts, e. g. a lower sleeve section 50 and an upper sleeve section 51, the meeting ends of said sleeve sections having dovetailing male portions 52 and female portions 53 cooperating to join said sections together for common rotative movement. The lower sleeve section 50 is suitably keyed or otherwise secured to said driven gear 49 so as to be rotated thereby. The upper sleeve section 51 is provided at its upper end portion with a neck portion 54 of reduced diameter, which in turn terminates in spring seating extension 55 of still further reduced diameter. Telescopically engaged over said neck portion 54 is a hub-sleeve 56 provided at its upper end with hub-stem 57. In the side of said hub-sleeve 56 is a vertical slot 58 into which extends a driver stud 59 which is secured to and projects laterally from said neck portion 54, whereby said hub sleeve and stem is rotatably driven by said rotatable sleeve structure, while free for vertical play relative thereto. A spring means 60 engaged upon said spring seating extension 55 thrusts vertically upward upon said hub sleeve and hub-stem. Adapted to be removably engaged with said hub stem 57, so as to be rotated thereby is a cutting means. This cutting means preferably comprises a hub 61 having male portions 62 to fit female portions 63 of said hub-stem 57, whereby rotative movement of the hub-sleeve is transmitted to the cutting means; suitably secured to said hub 61 for radial extension therefrom are cutter blades 64. Mounted on said lay shaft 47 is a sprocket 65, and cooperative with said lay shaft and sporcket, for connecting these parts in driving or non-driving relation, is a manipulatable clutch means 66. Suitably secured to the bridge block 36, to extend around and beneath the cutting means, is a discharge chute member C, adapted to receive the cut paste produced, when the press is operating to produce such products, and to convey the same outwardly from the machine for discharge into any suitable receptacle placed beneath the chute for the reception of the same.

Means is provided for driving the short paste cutting mechanism, when the same is put in service relative to the press. This means may be of any suitable or desirable character. Preferably the driving means is of a variable speed type, so that the speed of rotation of the cutter blades relative to the press die may be varied over a wide range according to the particular size and character of short paste product desired to be produced at any given time. Illustrative of one suitable arrangement of variable speed driving mechanism, the drawings show a well-known type of adjustable cone pulley actuated belt speed changer, generally indicated by the reference character 66, the driver shaft 67 of which may be driven by additional shiftable speed change gearing 68 from an electric power motor 69, or other suitable source of power. The driven shaft 70 of said speed changer 66 is provided with a sprocket 71, which may be put in driving relation to the sprocket 65 by an interengaging drive chain 72.

When it is desired to utilize the press for the production of short cut paste products, the cutting mechanism is swung into service position beneath the die bed-plate 17 of the press. Preparatory to moving said cutting mechanism from out of service position to said service position, the spindle 43 is turned, by means of the hand wheel 45, so as to screw the same downwardly relative to the bridge block 36, thus downwardly withdrawing the spindle 43 to lower its upper extremity to a level beneath the plane of the underside of the die bed-plate 17, and the upper sleeve section 51 together with the hub-sleeve 56 and associated parts and the cutter blade assembly 61—64 is slid upwardly off of the spindle, and thus removed therefrom. When the spindle is thus downwardly withdrawn and the cutter blade assembly removed therefrom, the bridge block 36 is swung about its pivotal connection into a position extending across the pedestals 11 and between the columns 12, thus axially aligning the spindle 43 with the main operative section of the press; the bridge block being locked in such service position by screwing home the set screw 41. When the bridge block 36 is thus disposed in service position, the sprocket 65 of power transmission means serving the cutting mechanism is positioned in alignment with the sprocket 71 of the variable speed driving means, and these sprockets 65—71 are operatively related by applying thereto the drive chain 72. The above described arrangements having been completed, the upper sleeve section 51, together with the hub-sleeve 56 and the cutter-blade assembly 61—64 are mounted upon the spindle 43 in operatively engaged relation subject to rotation by the power transmission mechanism. A suitable short paste forming die 73 is seated upon an annular seating ledge 74 which is countersunk in the top of the die bed-plate 17 concentric to the discharge opening 75 with which said bed-plate 17 is provided. The spindle 43 is screwed upwardly through the bridge block 36 until its upper extremity abuts the underside of the die 73 (see Fig. 4), thereby giving support to the center of the latter in opposition of the pressure exerted by the extension of paste material therethrough. The spring means 60 operative within and upon the hub sleeve 56, thrusts upwardly upon the latter to thereby yieldingly press the cutter blades 64 of the cutting mechanism firmly against the under face of the die 73 during revolution of the cutter blades around the die face.

When the press is arranged, as above described, ready for the production of short cut paste products, and a dough cylinder having been packed with dough, the cylinders are raised by the hydraulic lift jack mechanism so that the same may be revolved about the column 12 upon which they swing, thereby bringing the packed cylinder into alignment between the main pressure cylinder 14 and the die 73 as supported by the die bed-plate 17, whereupon the cylinders are lowered to operative position, thus closing the lower end of the packed cylinder (e. g. the cylinder 18) over the die 73 while the other cylinder (e. g. the cylinder 19) is disposed in outwardly offset position for packing.

The press being now ready for operation, the variable speed driving means for operating the cutting mechanism is set to produce the desired speed of revolution of the cutter blades 64 suited to the production of the particular type of cut paste product desired, whereupon the motor 69 is started to actuate the variable speed driving means. Starting and stopping of the cutter blade movement may be accomplished at will, without interrupting the operation of the motor 69 and the variable speed driving means actuated thereby, by throwing in and out the manipulatable clutch means 66. By suitable manipulation of the proper control valve means 35, fluid under pressure, as delivered by the pump means 34 from a reservoir R, is forced into the pressure cylinder 14 thereby causing the ram 15 to descend and thus enter the dough extrusion piston 16 through the upper end of the dough cylinder 18 to exert downward thrusting pressure upon the contained dough material. The pressure thus exerted upon the dough material extends the same through the openings of the die 73, and thus into the path of the revolving cutter blades 64. The cutter blades 64 cut off extruded portions of the dough as they emerge beyond the under face of the die 73, thus forming the cut paste elements. The cut paste elements thus formed, drop into the chute member C, being guided by the latter for final discharge into a receptacle set beneath the discharge end thereof to receive the same. As soon as one dough cylinder is empty, the other cylinder, which has in the meantime been packed, may be shifted into operative position for production of the cut paste, while the empty dough cylinder is disposed for replenishing the same with dough material. These operations may be continued at will.

When it is desired to utilize the press for the production of long paste products, such as macaroni, spaghetti and the like, the cutting mechanism is detached from the power transmission means, by removing the drive chain 72 from the sprocket 65, and after lowering the spindle 43 and removing the cutter blade elements, the bridge block 36 is released and swung outwardly to one side of the press to its out of service position, as shown in Fig. 2. The short paste forming die 73 is removed from the seat 74 of the die bed plate 17 to be replaced by a long paste forming die 76. In order to support and brace the die 76 against the pressure incident to the paste forming operation of the press, an auxiliary reenforcing spider 77 is provided, the same having a plurality of radial arms having footing tongues 78 at their free ends. Formed in the sides of the bed plate opening 75 are a plurality of upwardly open vertically extending seating notches 79, terminating at their lower ends in supporting shoulders 80. Preparatory to putting the die 76 in place, the spider 77 is mounted on the die bed-plate so as to bridge the opening 75 thereof, with its footing tongues 78 entered in the seating notches 79 so as to be supported on the shoulders 80. When the spider is thus assembled with the die bed-plate, the die 76 is dropped into place upon the seating ledge 74 and upon the spider 77, whereby the latter underlies the die so as to strongly support and brace the same. It will be obvious that the die extrusion openings will be arranged so as to overlie the spaces between the arms of the spider, so that the extruded long paste will clear and pass the spider arms.

After the die 76 and supporting spider 77 are in place, a dough packed cylinder is swung into registration therewith and lowered thereon, whereupon the press is ready for operation to produce long paste products. Operation of the ram 15 to lower the plunger 16 into the positioned dough cylinder with pressure exerting effect upon the contained dough, will cause the latter to be extruded through and from the die 76 in the form of long paste, which, when desired length thereof is attained, is cut off by hand ready to be taken and hung for the drying operations.

From the above description it will be apparent that the present invention provides a novel construction and arrangement of hydraulic press capable of serving, at will, the functions of producing long paste products or short cut paste products.

I am aware that many changes could be made in the above construction and many apparently widely different embodiments of this invention could be made without departing from the scope thereof, as defined in the following claims; hence it is intended that all matter contained in the above description or shown in the accompanying drawings shall be interpreted as illustrative and not in a limiting sense.

I claim:—

1. In a press of the kind described, a bridge block pivotally connected with the press frame to swing in horizontal plane into or out of alignment with the operative press cylinder and the cooperating paste forming die thereof, means to releasably lock said bridge block to the press frame and in operative relation to said press cylinder and die, a vertically movable spindle carried by said bridge block, a sleeve having a removable upper section rotatably mounted on said spindle, a hub-sleeve telescopically movable on said upper sleeve section, means to key said hub-sleeve to said upper sleeve section for rotation therewith, a cutter blade carried by said hub-sleeve, spring means between said upper sleeve section and said hub-sleeve for yieldably thrusting the latter upwardly to maintain said cutter blade in operative contact with said paste forming die, and connectable power transmission means for driving said sleeve structure to revolve said cutter blade.

2. In a press of the kind described, a bridge block pivotally connected with the press frame to swing in horizontal plane into and out of alignment with the operative press cylinder and the cooperating paste forming die thereof, means to releasably lock said bridge block to the press frame in its operative relation to said press cylinder, a cutter mechanism carried by said bridge block having a dismountable rotary cutting member to cooperate with the cylinder paste forming die, said mechanism including means to yieldably thrust said cutting member against said die and transmission means also carried by said bridge block for driving said cutter blade mechanism.

CONRAD AMBRETTE.